E. KRAMM.
Dust-Pan.
No. 168,839.
Patented Oct. 19, 1875.
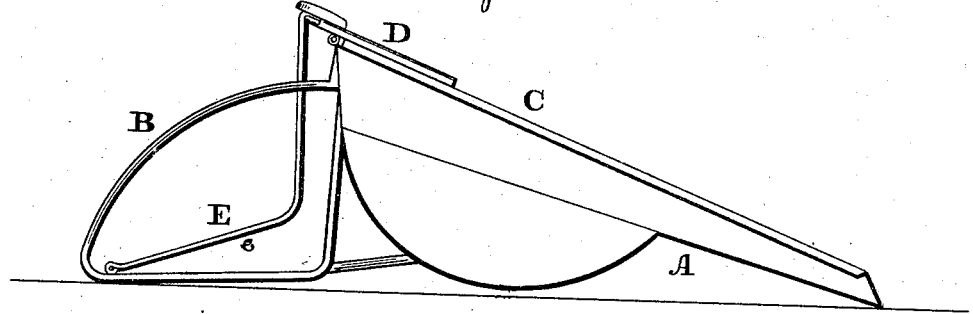
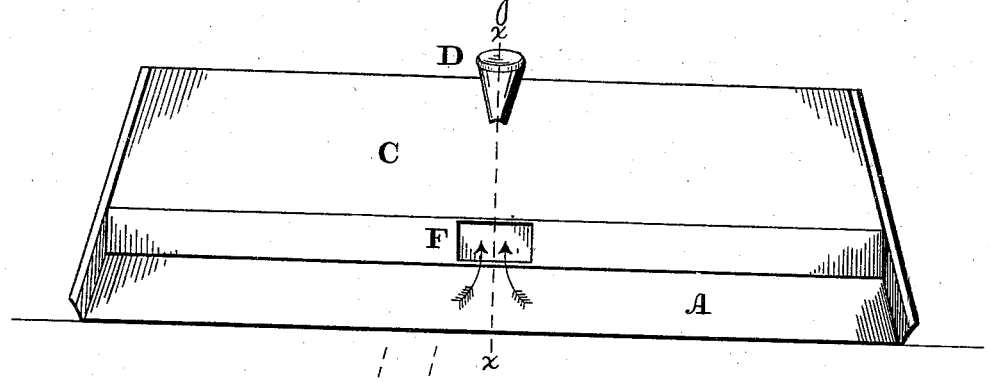
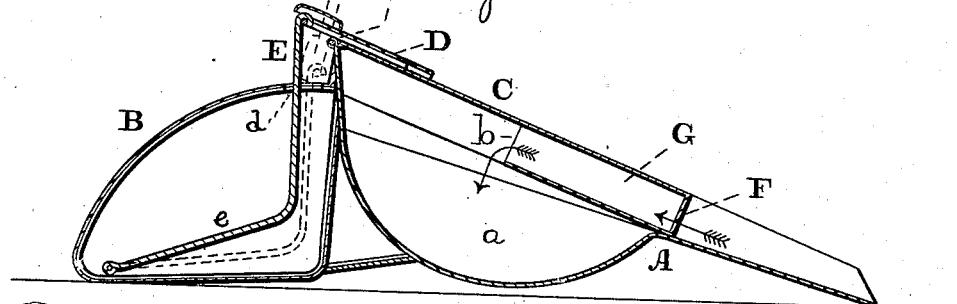
Witnesses:
L. F. Brous
A. P. Grant
Inventor:
Ephraim Kramm
by John A. Wiedersheim
Atty.

UNITED STATES PATENT OFFICE.

EPHRAIM KRAMM, OF NEW YORK, N. Y.

IMPROVEMENT IN DUST-PANS.

Specification forming part of Letters Patent No. 168,839, dated October 19, 1875; application filed February 5, 1875.

*To all whom it may concern:*

Be it known that I, EPHRAIM KRAMM, of the city, county, and State of New York, have invented a new and useful Improvement in Dust-Pans; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1 is a side view of the device embodying my invention. Fig. 2 is a front view thereof. Fig. 3 is a longitudinal vertical section thereof in line $x\,x$, Fig. 2.

Similar letters of reference indicate corresponding parts in the several figures.

My invention consists in a dust-pan having a lid, to which is connected a spring, operated by the foot to raise said lid and hold it automatically opened. It also consists in constructing the lid with a passage for directing roaches and other vermin into the space of the pan below the lid, whereby they will be trapped.

Referring to the drawings, A represents the platform of a dust-pan, and B the handle thereof. C represents a lid, which is hinged to the rear of the platform A, and covers the main portion or space $a$ thereof, so that the gathered dust may be confined by the lid. To the top of the lid, at the axial portion, is secured a strip, D, which extends rearward beyond the axis or over the handle B, and to the end thereof is jointed a spring, E, which extends downwardly into the handle through an opening, $d$, and is extended toward the back of the handle or bent, the extension or bend constituting a foot-piece, $e$, whose lower end has a bearing on the bottom portion of the handle.

It will be seen that by depressing the spring E the lid C is elevated, and when the latter is at its highest point the strip is out of center. The spring, then continuing to exert its pressure on the strip, causes the lid to be held in its elevated position, whereby the dust may be properly swept into the pan.

When the lid is to be closed it is merely forced down, the spring being overcome, and when the strip D is past the center the lid is quickly closed and firmly held on the platform A.

The handle B is adapted to rest on the floor, and made sufficiently large to receive the foot for purpose of movement of the pan from place to place; and when the lid is to be elevated the foot is placed on the piece $e$, so as to depress the latter, thus drawing down the spring E and throwing up or elevating the lid.

In the front end of the lid C is an opening, F, with which communicates a tube or channel, G, which extends rearward, and terminates at the point $b$, at or near the middle of the lid C over the space $a$. A quantity of molasses or other bait will be placed on the bottom of the space $a$, and access thereto will be had through the opening F and channel G, through which roaches and other vermin will enter; but, the elevated end $b$ of the channel G not being accessible, there is no exit for the vermin, who are thus trapped, and may be destroyed in any manner desired.

Having thus described my invention, what I claim as new, and desire to secure by Letters Patent, is—

1. The combination, with the dust-pan lid, of the spring E, jointed to the rear of the lid, projecting into the handle B, and formed with a foot-piece, $e$, substantially as and for the purpose set forth.

2. The dust-pan lid C, provided with a trap-channel, G, substantially as and for the purpose set forth.

EPHRAIM KRAMM.

Witnesses:
JOHN A. WIEDERSHEIM,
A. P. GRANT.